US009756085B2

(12) United States Patent
Chitty et al.

(10) Patent No.: US 9,756,085 B2
(45) Date of Patent: *Sep. 5, 2017

(54) PEER-TO-PEER INTERNET PROTOCOL TELEPHONE SYSTEM WITH SYSTEM-WIDE CONFIGURATION DATA

(71) Applicant: VTech Telecommunications Limited, Tai Po, New Territory (HK)

(72) Inventors: Jen T'ai Chitty, Surrey (CA); Christopher Rose, Surrey (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/076,295

(22) Filed: Mar. 21, 2016

(65) Prior Publication Data

US 2016/0205145 A1    Jul. 14, 2016

Related U.S. Application Data

(63) Continuation of application No. 14/576,064, filed on Dec. 18, 2014, now Pat. No. 9,294,516, which is a continuation of application No. 12/987,865, filed on Jan. 10, 2011, now Pat. No. 8,923,278.

(51) Int. Cl.
*H04L 29/06* (2006.01)
*H04L 12/66* (2006.01)
*H04M 7/00* (2006.01)

(52) U.S. Cl.
CPC ......... *H04L 65/1059* (2013.01); *H04L 12/66* (2013.01); *H04L 65/1053* (2013.01); *H04M 7/0063* (2013.01)

(58) Field of Classification Search
CPC .................................................. H04L 65/1059
See application file for complete search history.

(56) References Cited

U.S. PATENT DOCUMENTS

| | | | | |
|---|---|---|---|---|
| 6,084,952 A | * | 7/2000 | Beerman, Jr. | H03M 13/15 379/93.24 |
| 6,704,864 B1 | * | 3/2004 | Philyaw | G06F 9/4411 707/E17.113 |
| 7,486,610 B1 | | 2/2009 | Bhupalam et al. | |
| 7,925,722 B1 | * | 4/2011 | Reed | H04L 41/0809 709/220 |
| 8,443,072 B1 | * | 5/2013 | Orbach | H04L 47/11 709/223 |
| 8,737,384 B2 | * | 5/2014 | Rose | H04L 12/66 370/352 |
| 8,923,278 B2 | * | 12/2014 | Chitty | H04L 12/66 370/352 |
| 9,467,488 B2 | * | 10/2016 | Gundu | H04W 84/08 |
| 2001/0026545 A1 | * | 10/2001 | Matsumoto | H04Q 3/62 370/338 |

(Continued)

FOREIGN PATENT DOCUMENTS

EP    1 229 443 A2    8/2002

*Primary Examiner* — Parth Patel
(74) *Attorney, Agent, or Firm* — Steptoe & Johnson LLP

(57) ABSTRACT

Various embodiments of the invention provide a Peer-to-Peer (P2P, Internet Protocol (IP) telephone system. The telephone system includes a plurality of terminals coupled together via an IP network. The terminals cooperate with one another to provide telephony features without a dedicated central controller such as a PBX and/or a KSU controller. The terminals further cooperate with one another to maintain system-wide configuration data for the telephone system.

13 Claims, 4 Drawing Sheets

(56) References Cited

U.S. PATENT DOCUMENTS

| | | | |
|---|---|---|---|
| 2001/0037392 A1* | 11/2001 | Park | H04L 65/1059 709/227 |
| 2003/0021397 A1* | 1/2003 | Wengrovitz | H04L 12/5835 379/93.15 |
| 2003/0091028 A1* | 5/2003 | Chang | H04M 7/0057 370/352 |
| 2003/0217171 A1 | 11/2003 | Von Stuermer et al. | |
| 2004/0017901 A1* | 1/2004 | Lim | H04L 12/66 379/93.09 |
| 2004/0153549 A1* | 8/2004 | Naito | H04L 29/06 709/228 |
| 2004/0199579 A1* | 10/2004 | Straw | H04L 12/18 709/204 |
| 2004/0203378 A1 | 10/2004 | Powers | |
| 2005/0033816 A1 | 2/2005 | Yamaguchi et al. | |
| 2005/0096055 A1 | 5/2005 | Colban et al. | |
| 2005/0141483 A1* | 6/2005 | Wengrovitz | H04L 12/581 370/352 |
| 2005/0193249 A1 | 9/2005 | Poustchi et al. | |
| 2005/0207355 A1* | 9/2005 | Du | H04L 29/06027 370/260 |
| 2006/0159032 A1* | 7/2006 | Ukrainetz | H04L 29/12216 370/254 |
| 2006/0180709 A1* | 8/2006 | Breton | B61L 15/0036 246/1 C |
| 2007/0160034 A1* | 7/2007 | Koretsky | H04L 29/06027 370/352 |
| 2007/0254596 A1* | 11/2007 | Corson | H04W 40/244 455/68 |
| 2008/0008158 A1* | 1/2008 | Lee | H04L 12/581 370/352 |
| 2008/0062933 A1* | 3/2008 | Liu | H04W 48/12 370/332 |
| 2008/0199021 A1* | 8/2008 | Park | H04L 29/06027 381/81 |
| 2009/0034477 A1 | 2/2009 | Yamaguchi et al. | |
| 2009/0210532 A1* | 8/2009 | Lim | H04L 12/2805 709/226 |
| 2009/0238352 A1* | 9/2009 | Suzuki | H04M 3/42365 379/142.04 |
| 2009/0319247 A1* | 12/2009 | Ratcliffe, III | G09B 19/0053 703/13 |
| 2010/0067668 A1* | 3/2010 | Tasker | H04M 3/4878 379/88.17 |
| 2011/0106886 A1 | 5/2011 | Nolterieke et al. | |
| 2011/0110504 A1* | 5/2011 | Kaal | H04L 65/104 379/93.02 |
| 2011/0161421 A1 | 6/2011 | Lowery et al. | |
| 2011/0243141 A1* | 10/2011 | Blackburn | H04M 1/006 370/400 |
| 2012/0177032 A1 | 7/2012 | Chitty et al. | |

* cited by examiner

PEER-TO-PEER INTERNET PROTOCOL TELEPHONE SYSTEM WITH SYSTEM-WIDE CONFIGURATION DATA

CROSS-REFERENCE TO RELATED APPLICATIONS

This application is a continuation application of U.S. patent application Ser. No. 14/576,064, filed Dec. 18, 2014, now U.S. Pat. No. 9,294,516, which is a continuation of U.S. patent application Ser. No. 12/987,765, filed Jan. 10, 2011, now U.S. Pat. No. 8,923,278, which are hereby incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present invention relates to Peer-to-Peer (P2P), Internet Protocol (IP) telephone systems. More specifically, certain embodiments of the invention relate to maintaining system-wide configuration data in P2P, IP telephone systems.

BACKGROUND

Small enterprise environments typically desire telephone systems that provide a variety of communication features. For example, small enterprise environments typical desire telephones systems that provide internal intercom calls from one telephone terminal to another telephone terminal within the telephone system while still supporting external public switched telephone network (PSTN) calls between a telephone terminal within the system and an external telephone system connected to the PSTN. Other features desired by small enterprise environments may include call conferencing, call transferring, and voice mail functions. Due to the growth expectations and lack of dedicated IT personnel in small enterprises, there is a desire for such telephone systems to be readily expandable, require little-to-no manual configuration, and require little to-no special wiring.

SUMMARY

Aspects of the present invention are directed to methods, systems, and apparatus, substantially as shown in and/or described in connection with at least one of the figures and as set forth more completely in the claims.

These and other advantages, aspects and novel features of the present invention, as well as details of illustrative aspects thereof, will be more fully understood from the following description and drawings.

DETAILED DESCRIPTION

Aspects of the invention may be found in a method and apparatus for updating configuration data in a peer-to-peer (P2P), Internet Protocol (IP) telephone system. Certain embodiments of the invention provide a small enterprise telephone system comprising two or more telephone terminals that coordinate between themselves to implement private branch exchange (PBX) and/or key services unit (KSU) type functionality without the use of a central PBX and/or KSU controller. An Internet Protocol (IP) network is used to support communication and coordination between the telephone terminals. Each telephone terminal supports features and functions that may be offered as resources to the telephone system as a whole and may be shared between the various telephone terminals. One or more of the terminals may provide a network-accessible user interface (UI) that permits a user of the system to change configuration data distributed among various terminals of the system.

Due to its P2P nature, the small enterprise telephone system may be expanded with a high degree of flexibility according to the desires of a small enterprise. In particular, telephone terminals with different features may be added and/or removed from the telephone system in order to provide the small enterprise with a desired feature set. For example, telephone terminals may include but are not limited to (a) telephone terminals with corded handset, keypad and display, (b) telephone terminals with corded handset, keypad, display, and a PSTN telephone jack to support calls using a public switched telephone network (PSTN), (c) basic telephone terminals with corded handset, keypad, display, and a telephone answering device that provide voice mail functions, and (d) wireless telephone terminals that connect to the IP network via a wireless IP link.

Figure 1:
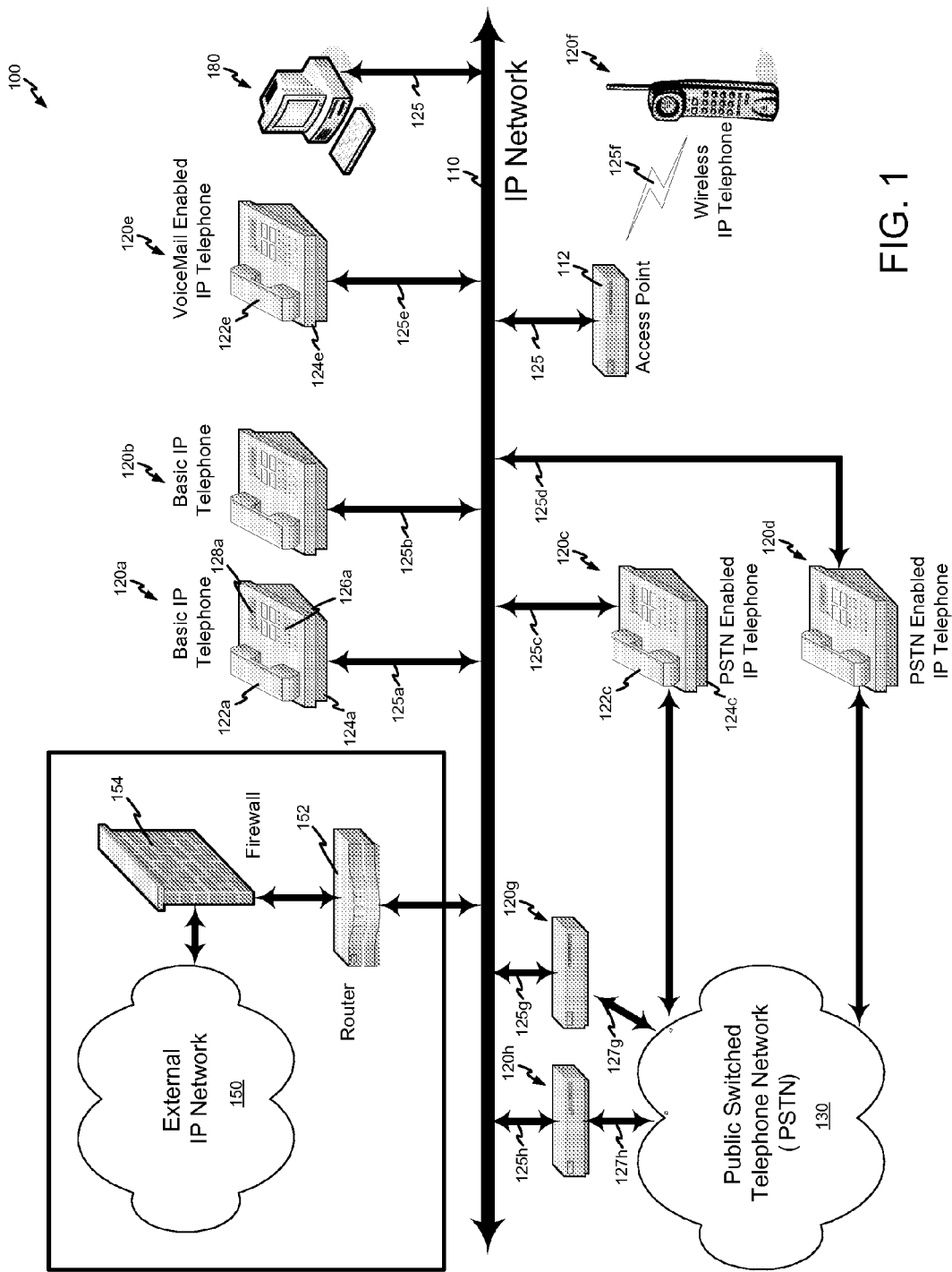
FIG. 1 is a diagram that illustrates a peer-to-peer (P2P), internet protocol (IP) telephone system, in accordance with an embodiment of the invention.

Referring now to FIG. 1, a small enterprise telephone system 100 that uses an IP network 110 to support communication between a plurality of telephone terminals 120 (i.e., terminals 120a-120f) is shown. Unlike conventional Voice over Internet Protocol (VoIP) telecommunications system, the telephone system 100 does not include a central controller node, such as a PBX and/or KSU controller. Rather, control and switching for the telephone system 100 is coordinated among the telephone terminals 120.

As shown, the system 100 uses an IP network 110 to communicatively couple the plurality of telephone terminals 120 to one another. In one embodiment, the IP network 110 is implemented with a fast Ethernet network (e.g., 10/100 base T). However, the I P network 110 may be implemented using other types of IP based networks such as, for example, wireless 802.11 wireless networks, HomePlug power-line networks, public Internet network, etc.

FIG. 1 shows different types of telephone terminals 120. In particular, telephone terminals 120a, 120b are depicted as basic IP telephone terminals coupled to the IP network 110 via wired IP connections 125a, 125b (e.g., a Cat 5 Ethernet cable). The basic IP telephone terminal 120a may include a handset 122a and base unit 124a, which provide a voice interface and a user interface to the system 100. In particular, the handset 122a may be coupled to the base unit 124 via a cord (not shown).

The handset 122a and base unit 124 may each include a microphone and speaker (not shown). As a result, a user may interact with the telephone system 100 via the voice interface provide by the handset 122a which receives voice input from a user and outputs audio signals to the user via its microphone and speaker. Alternately, a user may elect to interact with the telephone system 100 via the voice interface provided by the base unit 124a, which receives voice input from a user and outputs audio signals to the user via its microphone and speaker when operating in a speakerphone mode of operation.

In addition to the voice interface, the handset 122a and the base unit 124a may each include a keypad 126a and display 128a which provide a user interface to the system 100. The keypad 126a may permit a user to input digits and/or other information via one or more key presses, and the display 128a may provide the user with textual and/or graphical information. Furthermore, the base unit 124a may include an network interface configured to transmit and receive IP packets over the IP network 110. The base unit 124a may also include circuitry (e.g., processor, microcontroller, data storage devices, etc.), software, and/or firmware configured to conduct a telephone call over the IP network 110.

Besides basic IP terminals 120a, 120b, the telephone system 100 may further include PSTN enabled IP telephone terminals 120c, 120d that are coupled to the IP network 110 via wired IP connections 125c, 125d. In particular, the telephone terminal 120c may include a handset 122c and base unit 124c that provide the telephone terminal 120c with functionality similar to that provided by the basic IP telephone terminals 120a, 120b. However, the handset 122c and base unit 124c further include a PSTN interface and corresponding circuitry to convert signals between the PSTN 130 and the IP network 110. In particular, the telephone terminals 120c, 120d include circuitry configured to handle on-hook/off-hook signaling, the detection of incoming PSTN calls, the reception of call ID (CID) signals, the generation of outgoing dialing tones/pulses, and the conversion of voice signals. In one embodiment, the IP telephone functionality of the telephone terminals 120c, 120d are functionally independent of the PSTN interface functionality, thus permitting simultaneous usage of both the IP telephone functionality and the PSTN interface functionality of the terminals 120c, 120d.

As shown, the telephone system 100 may further include VoiceMail (VM) enabled IP telephone terminal 120e that is coupled to the IP network 110 via a wired IP connection 125e. The telephone terminal 120e includes a handset 122e and base unit 124e that provide the telephone terminal 120e with functionality similar to that provided by the handset and base unit of the basic IP terminal 120a. The base unit 124e, however, further includes an integrated telephone answering device, which may provide voicemail features to all of the telephone terminals 120 of the telephone system 100.

The telephone system 100 may also include a wireless IP telephone terminal 120e that is coupled to the IP network 110 via a wireless IP connection 125f and a wireless access point 112. The wireless IP telephone terminal 120f provide functionality similar to that provided by the basic IP telephone terminals 120a, 120b. However, unlike the basic IP telephone terminals 120a, 120b, the wireless IP telephone terminal 120f is not tethered to the telephone system 100 by a wired IP connection, thus permitting the user of the wireless IP telephone 120f greater mobility.

The telephone system 100 may also include gateway terminals 1206g-h. Each gateway terminal 120g-h may be connected to the IP network 110 via a respective wired connections 125g-h and to the PSTN 130 by one or more (e.g., four) wired connections 127g-h. Each gateway terminal 120g-h in one embodiment operates in a manner similar to the PSTN-enabled, IP telephone terminals 120c-d by providing PSTN connectivity to other terminals 120 of the telephone system 100.

The telephone system 100 may further include one or more computing devices 180 such as a laptop computer, desktop computer, workstation, handheld device, and/or other device that may be coupled to the IP network 110. The computing device 180 may include digital circuitry (e.g., processors, memory, and control logic), software and/or firmware, and user interface hardware (e.g., keyboard, mouse, display, etc.) that in combination present a user with a client suitable for interacting with a network-accessible interface of the terminals 120.

Each telephone terminal 120 provides one or more resources that contribute to the entire functionality of the telephone system 100. The PSTN enabled IP telephone terminal 120c, for example, provides to a user of the telephone terminal 120c (a) a user extension resource for voice communication, (b) a user display resource for messaging purposes, and (c) a user keypad resource of user input. Moreover, the PSTN enable IP telephone terminal 120c provides a PSTN interface resource for not only the PSTN enabled IP telephone terminal 120c but the other IP telephone terminals 120 of the telephone system 100. Similarly, the VM-enabled telephone terminal 120d provides VM functionality not only to the user of the VM-enable telephone terminal 120d, but also to the other IP telephone terminals 120 of the telephone system 100.

The IP telephone terminals 120 described above are not an exhaustive set of the terminals that may be added to the telephone system 100. Other types of P2P terminals are contemplated and may be added to the telephone system 100 in order to expand the overall functionality of the telephone system 100. For example, the telephone system 100 may further include terminals which provide only a PSTN interface (e.g., a terminal similar to terminal 120c, but without a telephone handset), terminals which provide only VoiceMail functionality (e.g., a terminal similar to terminal 120e, but without a telephone handset), a video IP phone terminal which supports video IP communication, and other terminal configurations.

As shown, the telephone system 100 may also include an interface between the local IP network 110 and an external IP network 150 (e.g., the Internet). Such an interface may include a router 152 and/or firewall device 154. While not essential for the operation of the telephone system 100, such an external interface supports communication between IP telephone terminals 120 within the telephone system 100 and IP telephone terminals 120 external to the telephone system 100, whether they be at a remote office (acting as an extension to the telephone system 100) or at a 3rd party site (either a VoIP service provider or an IP based end terminal).

Due to its P2P nature, the telephone system 100 uses various nonconventional techniques to provide operation and features comparable to those available in conventional PBX and/or KSU systems. One such technique relates to discovery of terminals such as IP telephone terminals 120. In response to a terminal 120 being connected to the telephone system 100, the newly added terminal 120 performed two tasks. First, the new terminal 120 discovers which other terminals 120 are already connected to the telephone system 100, their capabilities (resource set), and their addresses so that the terminal 120 may configure itself for use in the telephone system 100. Second, the newly added terminal 120 announces its presence on the telephone system 100 to notify existing terminals 120 of its capabilities and address.

In one embodiment, an extension of the DHCP (Dynamic Host Configuration Protocol) is used to implement the discovery process. In such an embodiment, a newly connected terminal 120 broadcasts on the system 100 a request for DHCP services which typically assigns an IP address to the new terminal 120. In particular, the new terminal 120 may identify itself (e.g., a VoIP terminal) with the DHCP request. Existing terminals 120 of the telephone system 100 may also receive the broadcast DHCP request and response and update their configuration information accordingly so that they may directly communicate with the newly added terminal 120 at the addressed assigned by the DHCP server. Other terminals 120 already on the system 100 also receive the DHCP broadcast. While an extension of the DHCP protocol may be used, other embodiments may implement terminal discovery using another protocol. For example, other embodiments may use other protocols such as, for example, the BOOTP protocol, the Web Proxy Autodiscovery (WPAD) protocol, the Zeroconf protocol, the Boot Service Discovery Protocol (BSDP), the Universal Plug and Play (UPnP) set of protocols, and/or a custom protocol.

As an example of a custom protocol, a newly added terminal 120 may listen for beacon signals on the IP network 110 to determine whether a telephone system 100 is established. In response to a beacon signal, the terminal 120 may request the sender of the beacon signal (e.g., a Master Coordinator as explained in detail below in regard to FIG. 2-4) to join the telephone system 100. The newly added terminal 120 may then wait for a beacon signal that indicates system-wide configuration data has been updated. The updated system-wide configuration data may include an extension number for the terminal 120 which advises the newly added terminal and other terminals 120 in the telephone system 100 of the resources available in the new terminal 120.

Once terminals 120 are aware of other terminals on the system 100, the terminals 120 may configure themselves. For example, a newly added terminal 120 in the system 100 may be able to detect, for example, that there are other terminals 120 with extension numbers 10, 11 and 12. The newly added terminal 120 may be able to automatically configure itself to be extension number 13, and may then advise the other terminals 120 of its selected extension number. However, if the newly add terminal 120 had been previously configured with the extension number 14, then the terminal 120 may retain this extension number. Similarly, if this newly added terminal 120 has PSTN interface, then the existing terminals 120 may re-configure themselves to support use of this newly available PSTN telephone line. Further details regarding updating configuration data which may be used by some embodiments is presented below.

The telephone system 100 in certain embodiments supports resource sharing. As a result of such resource sharing, a small enterprise may continually expand the telephone system 100 by installing new terminals 120. For example, if a user of terminal 120*a* desires to make a PSTN call, the terminal 120 may send a message to terminal 120*c* requesting use of it's PSTN interface. Terminal 120*a*, in one embodiment, already knows that terminal 120*c* has a PSTN interface due to the discovery process. If the PSTN interface of terminals 120*c* is not already in use, then terminal 120*c* may assign the PSTN resource to terminal 120*a*. If further requests for the PSTN resource arrive at terminal 120*c* while still being assigned to terminal 120*a*, then terminal 120*c* may deny such additional requests until terminal 120*a* has completed it's use of the PSTN resource. Terminal 120*a* may then forward a message to terminal 120*c* which requests terminals 120*c* to dial the appropriate telephone number for PSTN call on the PSTN network 130, and establish a VoIP connection between the PSTN network 130 and terminal 120*a*.

In some embodiments, terminal 120*c* may still be available for calls on the IP network 110 since the PSTN interface to the PSTN network 130 and VoIP interface to the IP network 110 are implement as independent resources in some embodiments. Furthermore, if a user at terminal 120*c* wishes to make a PSTN call while its PSTN interface is still assigned to terminal 120*a*, terminal 120*c* may request use of the PSTN interface of terminal 120*d* to facilitate this PSTN call. In this way, any IP telephone terminal 120 in the telephone system 100 has the ability to access any PSTN connection.

Other resources, such as a voice mail system, may be shared among the terminals 120 in a similar fashion. Once a terminal 120 is finished with a resource, a message is sent to the associated terminal 120 indicating the resource may be released and made available for other requests from the telephone system 100. The terminals 120 may also implement a time-out mechanism to ensure the telephone system may recover from error conditions such as a terminal 120 being disconnected from the IP network when in control of a resource of another terminal 120.

The telephone system 100 may further include distributed control aspects. In particular, each of the terminals 120 may include circuitry, software, and/or firmware which determine how to best facilitate a user's request. In a conventional PBX and/or KSU system, a central PBX and/or KSU server controls of all resources of the telephone system. In the peer-to-peer telephone system 100, each terminal 120 controls only those resources that are part of its hardware, and loans them to other terminals 120 based on resource requests. The distributed control enables a terminal 120 to resolve conflicts where the terminal 120 may receive simultaneous resource requests, as well as enabling terminals 120 to determine where in the telephone system 100 to seek specific resources.

As mentioned above, the telephone system 100 is a P2P telephone system in which the terminals 120 communicate directly with each other without the coordination efforts of a central controller such as a PBX and/or KSU central controller. For proper operation of the telephone system 100, the terminals 120 include configuration data that is shared among all terminals 120 within the telephone system 100. For example, the configuration data shared among the terminals 120 may include a list of all the telephone terminals 120 and corresponding extension numbers. It is not practical for an end-user to manually update all terminals 120 in the telephone system 100 to contain the same configuration data. Moreover, the telephone system 100 does not contain a dedicated central controller for coordinating the dispersal of such configuration data. Accordingly, each terminal 120 of the telephone system 100 implements a process that automatically propagates configuration data throughout the P2P, IP telephone system 100.

Figure 2:
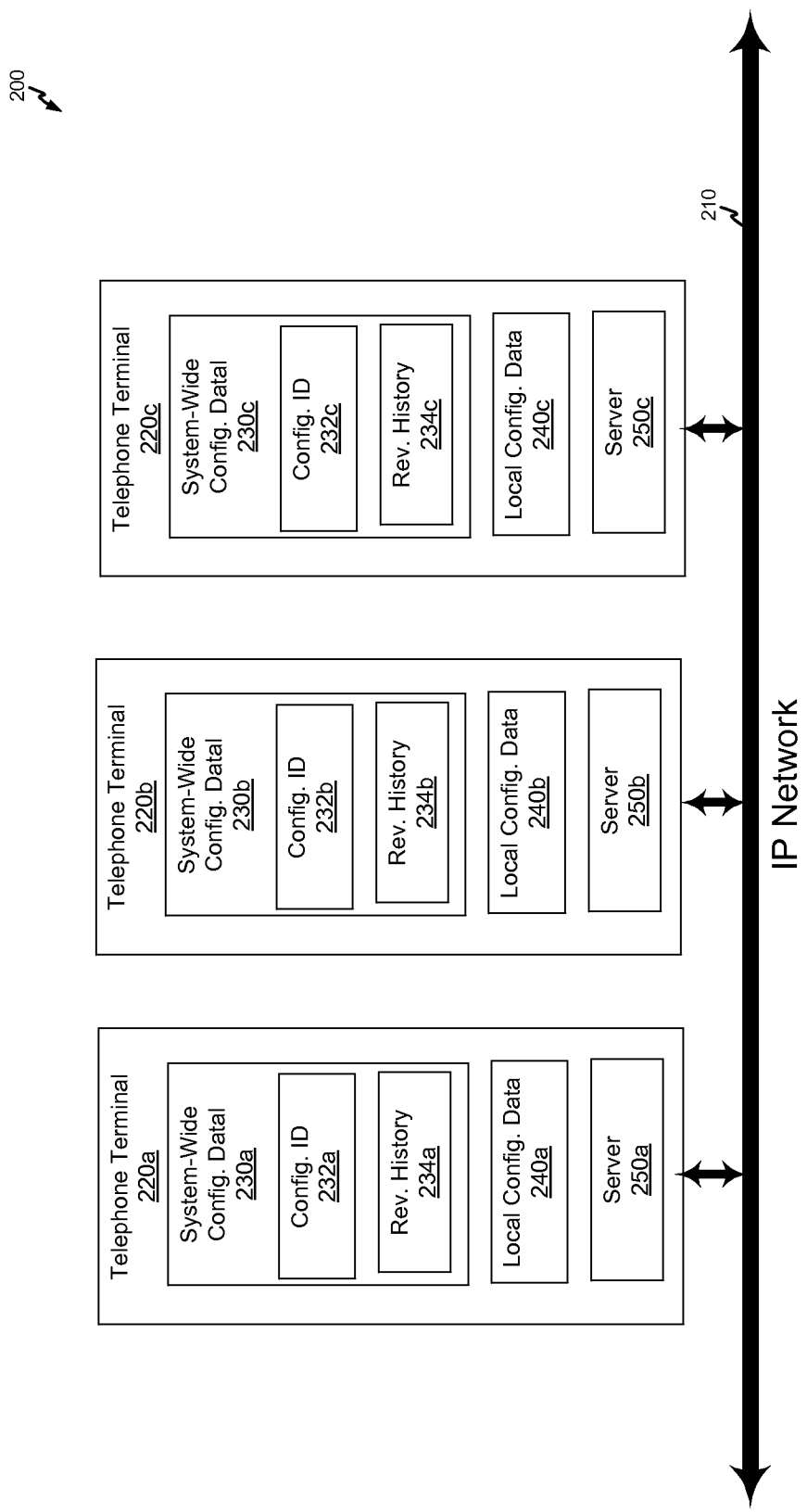
FIG. 2 is a simplified diagram of a P2P, IP telephone system, in accordance with an embodiment of the invention.
Figure 3:
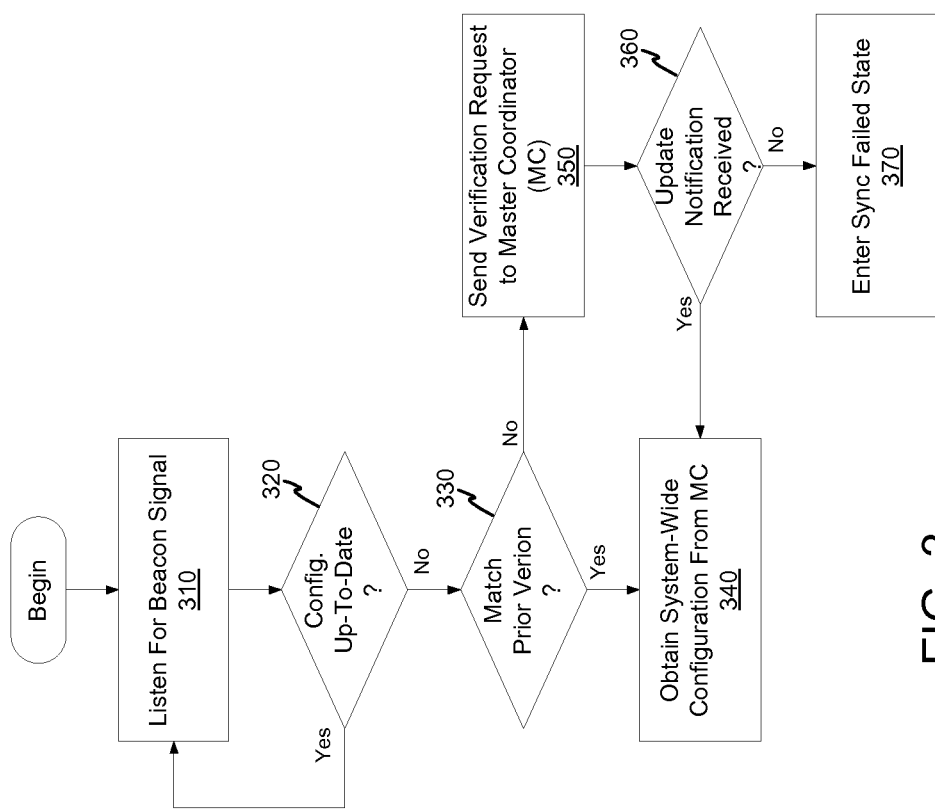
FIG. 3 is a flowchart of a method used by a peer terminal of the P2P, IP telephone system of FIG. 2 to determine whether its stored system-wide configuration data is up-to-date.
Figure 4:
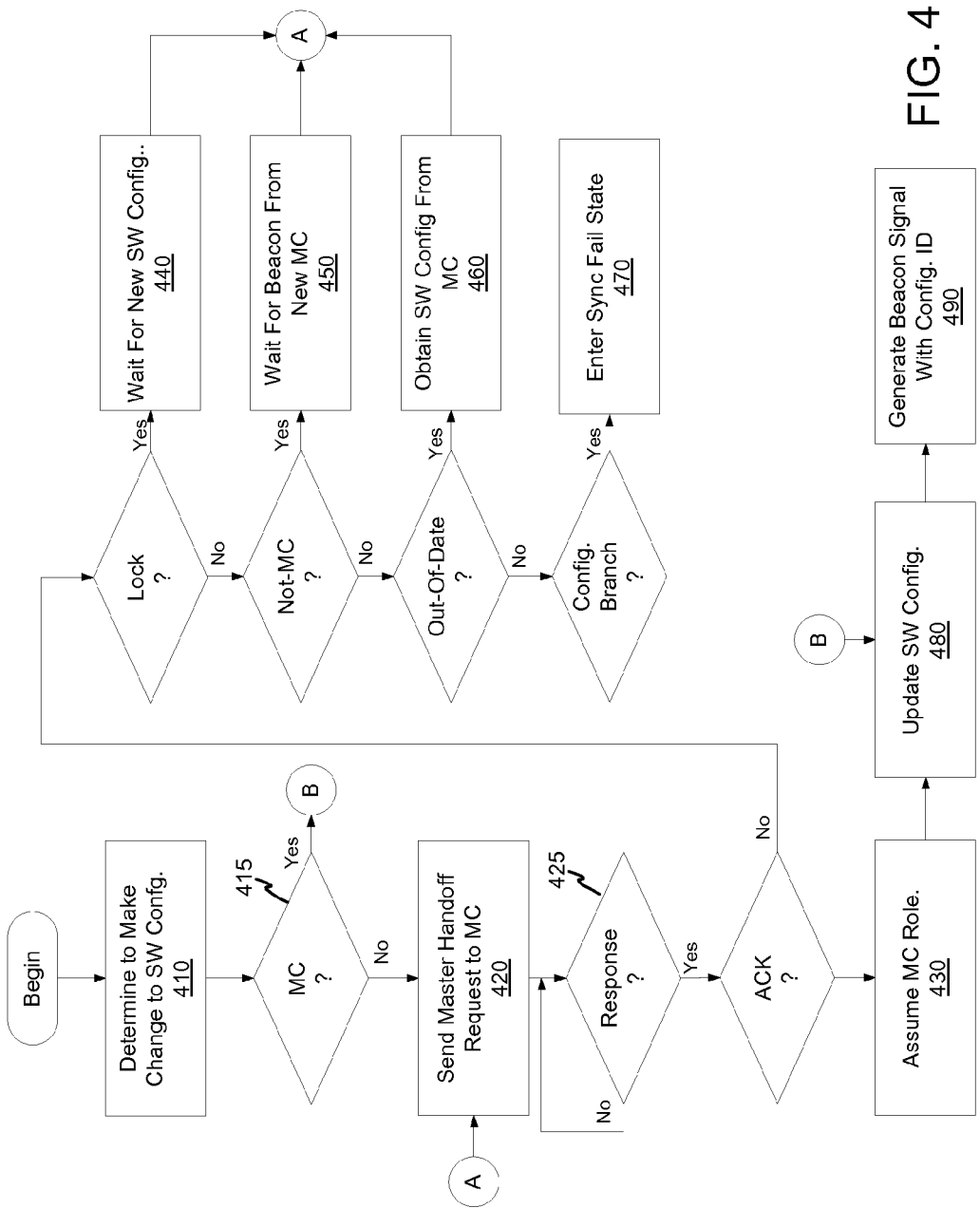
FIG. 4 is a flowchart of a method used by the terminals of the P2P, IP telephone system of FIG. 2 to update the system-wide configuration data.

Details of such a process are described in reference to FIGS. 2-4, where FIG. 2 shows a simplified block diagram of the telephone system 100 that highlights aspects of a P2P, IP telephone system which relate to configuration data and propagating such configuration data throughout the P2P, IP telephone system. In particular, FIG. 2 shows a telephone system 200, which may be implemented in a manner similar to the telephone system 100 of FIG. 1. The telephone system 200 is shown with a first terminal 220a, a second terminal 220b, and a third terminal 220c coupled to one another via an IP network 210. While telephone system 200 is shown with three terminals 220, other embodiments of a P2P, IP telephone system may include a different number of terminals 220.

As shown, each terminal 220a-c may include system-wide configuration data 230a-c, local configuration data 240a-c, and a server 250a-c configured to maintain the system-wide configuration data 230a-c. The local configuration data 240a-c may include configuration data to configure and/or customize the operation of the respective terminal 220a-c. Moreover, other terminals 220a-c of the system 200 may have no interest and/or need to know the local configuration data 240a-c of another terminal 220a-c in order to properly operate within the P2P context of the telephone system 200. For example, the local configuration data 240a stored in terminal 220a may include data regarding the capabilities of its speakers, its handset and base unit microphones, and its display, etc.

Conversely, the system-wide configuration data 230a-c generally relates to configuration data which terminals 220a-c of the system 200 require in order to properly configure themselves for operation within the P2P, IP telephone system 200. For example, the system-wide configuration data 230a-c may include a list of terminals 220a-c in the system 200, addresses assigned to the terminals 220a-c, extension numbers assigned to the terminals 220a-c, resources provided by each of the terminals 220a-c, a telephone directory, etc. Thus, while the local configuration data 240a-c may differ between terminals 220a-c, the system-wide configuration data 230a-c in one embodiment is the same in each terminal 220a c assuming each terminal 220a-c has the latest system-wide configuration data 230a-c for the system 200.

As shown, the system-wide configuration 230a-c may further include a configuration identifier 232a-c and a revision history 234a-c. The configuration identifier 232a-c provides a unique identifier for each version of the system-wide configuration data 230a-c. As such, if the configuration identifiers 232a-c of two terminals 220a-c match, then the stored system-wide configuration data 230a-c of the two terminals 220a-c match. Conversely, if the configuration identifiers 232a-c of two terminals 220a-c do not match, then the stored system-wide configuration data 230a-c of the two terminals 220a-c do not match.

The revision history 234a-c may include configuration identifiers 232a-c for one or more prior versions of the system-wide configuration data 230a-c. In one embodiment, the revision history 234a-c retains a limited number of configuration identifiers. The number of configuration identifiers maintained by the revision history 234a-c, in one embodiment, is chosen such that if a terminal 220a-c is powered down or disconnected from the IP network 210 for a reasonable period of time, the terminal 220a-c is likely to still contain system-wide configuration data 230a-c having an configuration identifier 232a-c in the revision history 234a-c of the other terminals 220a-c when reconnected to the IP network 210. As such, if the configuration identifier 232a-c of a terminal 220a-c matches a configuration identifier of the revision history 234a-c, then the system-wide configuration data 230a-c of the terminal 220a-c corresponds to a prior, out of-date version of the system-wide configuration data 230a-c. Conversely, if the configuration identifier 232a-c of a terminal 220a-c does not match a configuration identifier of the revision history 234a-c, then the system-wide configuration data 230a-c of the terminal 220a-c may be a branch of the system-wide configuration data 230a-c and may not correspond to a prior version of the system-wide configuration data 230a-c. However, since the revision history 234a-c stores a limited number of prior configuration identifiers, the absence of a match may simply be an indication that the system-wide configuration data 230a c corresponds to an older version of the system-wide configuration data 230a-c that is no longer present in the revision history 234a-c.

Thus, each terminal 220a-c may use its system-wide configuration data 230a-c to configure itself for proper operation in the telephone system 200. Moreover, as explained in more detail below, the each terminal 220a-c may use the its configuration identifier 232a-c to determine whether its stored system-wide configuration data 230a-c is the latest system-wide configuration data 230a-c for the P2P, IP telephone system 200.

To this end, the server 250a-c of each terminal 220a-c is configured to determine whether its system-wide configuration data 230a-c corresponds to the latest system-wide configuration data 230a-c for the system 200. If a server 250a-c determines that its system-wide configuration data 230a-c is not the latest configuration data for the telephone system 200, the server 250a is configured to obtain the latest system-wide configuration data via servers 250a-c of another terminal 220a-c and to update its copy of the system-wide configuration data 230a-c accordingly. Moreover, the servers 250a-c of the terminals 220a-c may provide an interface to change the system-wide configuration data 230a-c and propagate such changes to terminals 220a-c throughout the system 200.

In some embodiments, each server 250a-c includes a hypertext transfer protocol (HTTP) server and associated business logic to maintain the system-wide configuration data 230a-c in the manner described below. To this end, each terminal 220a-c may include digital circuitry (e.g., processors, memory, and control logic) as well as software and/or firmware that in combination receive, transfer, and update the system-wide configuration data 230a-c in a manner as described below. While each server 250a-c, in one embodiment, may include an HTTP server and associated business logic to receive, transfer, and update the system-wide configuration data 230a-c, other embodiments may utilize other data transfer protocols, servers, and/or clients in order to receive, transfer, and update the system-wide configuration data 230a-c.

Given the P2P nature of the telephone system 200, each terminal 220a-c may play the role of server and the role of client. In regard to maintaining the system-wide configuration data 230a-c, the telephone system 200 introduces the role of Master Coordinator (MC). In one embodiment, any terminal 220a-c of the telephone system 200 may obtain the role of Master Coordinator; however, the terminals 220a-c coordinate with one another such that only a single terminal 220a-c of the telephone system 200 plays the role of Master Coordinator at a given time. The terminal 220a-c with the Master Coordinator role may periodically (e.g., every 2 seconds) broadcast a beacon signal over the IP network 210 that is received by the other terminals 220a-c of the telephone system 200. In one embodiment, the beacon signal includes at least (i) a system identifier which enables multiple P2P, IP telephone systems to coexist on the same IP network 210, and (ii) a configuration identifier for its stored system-wide configuration data 230a-c. The terminals 220a-c are configured such the terminal 200a-c with the Master Coordinator roles has the most up-to-date version of the system-wide configuration data 230a-c. As such, the peer terminals 220a-c may determine whether their stored copies of the system-wide configuration data 230a-c are in sync with the system-wide configuration data 230a-c of the Master Coordinator and therefore up-to-date.

In some embodiments, the beacon signal further includes (iii) a configuration identifier for a prior version of the system-wide configuration data 230a-c. The configuration identifier for a prior version enables the peer terminals 220a-c to determine that their stored copies of the system-wide configuration data 230a-c are merely out-dated and not possibly a separate branch from the most current system-wide configuration data. If merely out-dated, a peer terminal 220a-c may update its stored system-wide configuration data 230a-c to the latest version of the system-wide configuration data 230a-c without losing configuration data. However, if a peer terminals 220a-c determines the configuration identifier for the stored system-wide configuration data 230a-c does not match a prior revision of the system-wide configuration data 230a-c, then its configuration data may include configuration not found in the most current system-wide configuration data 230a-c. As such, the peer terminal 220a-c may not be able to update to the latest version of the system-wide configuration data 230a-c without losing important configuration data. In such situations, manual intervention may be required in order to resolve conflicts in configuration data and properly configure the peer terminal 220a-c.

Referring now to FIG. 3, a method 300 used by a peer terminal to determine whether its stored system-wide configuration data is up-to-date is shown. In order to simplify the following description of method 300, terminal 220a is assumed to have the Master Coordinator role and terminal 220b is assumed to have a peer role. While the method 300 is described from the standpoint of terminal 220b, it should be appreciated that any of the terminals 220a-c when acting in the peer role may operate in accordance with the following described method 300.

As shown at 310, the peer terminal 220b of the telephone system 200 may listen on the IP network 210 for a periodic beacon signal transmitted by Master Coordinator terminal 220a. At 320, the peer terminal 220b, in response to receiving the beacon signal, may determine whether its stored system-wide configuration data 230b is up-to-date. In particular, the peer terminals 220b may compare the configuration identifier of the beacon signal with its configuration identifier 232b. If the configuration identifier of the beacon signal matches the configuration identifier 232b, then the terminal 220b may determine that its stored system-wide configuration data 230b is up-to-date. In which case, the terminal 220b may return to 310 in order to listen for the next beacon signal.

However, if the configuration identifier of the beacon signal is different than its configuration identifier 232b, then the peer terminal 220b may determine that its stored system-wide configuration data 230b is no longer in sync with the system-wide configuration data 230a of the Master Coordinator 220a. In which case, the peer terminal 220b may proceed to 330 to determine the appropriate action to take.

At 330, the peer terminal 220b may determine whether its configuration identifier 232b matches a prior version configuration identifier provided by the beacon signal. In particular, the beacon signal in one embodiment includes both the configuration identifier for the current version of the system-wide configuration data 230a and the configuration identifier for the immediate prior version of the system-wide configuration data. As such, if the peer terminal 220b determines that its configuration identifier 232b matches the configuration identifier of the beacon signal for the immediate prior version of the system-wide configuration data, then the peer terminal 220b may determine that it can safely update its system-wide configuration data 230b to that of the Master Coordinator terminal 220a. Accordingly, the peer terminal 220b at 340 may obtain the system-wide configuration data 230a from the Master Coordinator terminal 220a and update its system-wide configuration data 230b to the obtained system-wide configuration data 230a. In one embodiment, the peer terminals 220b obtain the system-wide configuration data 230b via an HTTP Get request. However, it should be appreciated that other techniques and protocols may be used to obtain the system-wide configuration data 230a from the Master Coordinator terminal 220a.

If the peer terminal 220b determines its configuration identifier 232b does not match the prior version configuration identifier provided by the beacon signal, then the peer terminal 220b at 350 may send a verification request to the Master Coordinator terminal 220a. In particular, the peer terminal 220b includes its configuration identifier 232b in the verification request so that the Master Coordinator terminal 220a may determine whether the configuration identifier 232b matches a configuration identifier of its revision history 234a. If the configuration identifier 232b is present within the revision history 234a of the Master Coordinator terminal 220a, then the Master Coordinator terminal 220a may determine that the peer terminal 220b has a prior version of its system-wide configuration data 230a. In which case, the Master Coordinator terminal 220a informs the peer terminal 220b to update its system-wide configuration data 230b.

If, however, the configuration identifier 232b is not present in the revision history 234a of the Master Coordinator terminal 220a, then the Master Coordinator terminal 220a may assume that the system-Wide configuration data 230b of the peer terminal 220b has diverged from the system-wide configuration data 230a of the Master Coordinator terminal 220a and may contain configuration data not present in its system-wide configuration data 230a. In which case, the terminal 220a may (a) request user intervention to delete the system-wide configuration data 230b on the diverged peer terminal 220b, and start fresh, (b) request a user to identify which portions of the system-wide configuration data 230b of the peer terminal 220a are correct and manually synchronize, or (c) attempt to automatically reconcile differences between the system-wide configuration data 230b of the peer terminal 220b and the system-wide configuration 230a of the Master Coordinator terminal 220a by examining the their contents and trying to establish patterns of similarity. In any case, the peer terminal 220b cannot continue being a part of the system 200 until the differences within the system-wide configuration data 230a, 230b are reconciled.

Accordingly, the peer terminal 220b in one embodiment may determine at 350 whether an update notification was received from Master Coordinator terminal 220a in response to its verification request. If an update notification is received, then the peer terminal 220b may determine that it can safely update its system-wide configuration data 230b to that of the Master Coordinator terminal 220a. Accordingly, the peer terminal 220b at 340 may obtain system-wide configuration data 230a from the Master Coordinator terminal 220a and update its system-wide configuration data 230b to the obtained system-wide configuration data 230a. However, if an update notification was not received from the Master Coordinator terminal 220a, then the peer terminal 220b may determine that its system-wide configuration data 230b is a possible branch of the system-wide configuration data 230a and that manual intervention is required. In which case, the peer terminal 220b at 370 enter a Sync Failed state in which it may remove itself from the telephone network 200 and generate an alert. The alert (e.g., message on its display, flashing light, etc.) may inform a user that intervention may be required to configure the peer terminal 220b for the telephone network 200.

Referring now to FIG. 4, a method 400 used by the terminals 220a-c to update the system-wide configuration data is shown. As mentioned above, the terminals 220a-220c coordinate with one another to ensure that the Master Coordinator terminal 220a-200c stores the most up-to-date version of the system-wide configuration data 230a-c. Accordingly, in order to update the system-wide configuration data 230a-c, a peer terminal 220a-220c in one embodiment first obtains the role of Master Coordinator. In order to simplify the following description of method 400, terminal 220a is assumed to have the Master Coordinator role and terminal 220b is assumed to have a peer role. While the method 400 is described from the standpoint of terminal 220b, it should be appreciated that any of the terminals 220a-c when acting in the peer role may operate in accordance with the following described method 400.

At 410, the terminal 220b may determine to make a change to its system-wide configuration data 230b. The terminal 220b at 415 may determine whether it already is operating as the Master Coordinator. If the terminal 220b is already operating as the Master Coordinator, then it may proceed to 480 to update its system-wide configuration data 230b. However, as mentioned above, terminal 220b is operating as a peer. Accordingly, the terminal 220b proceeds to 420 and sends a master handoff request to terminal 220a which the terminal 220b believes to be operating as the Master Coordinator. In particular, the master handoff request sent to the terminal 220a includes the configuration identifier 232b for the peer terminal 220b.

At 425, the terminal 220b may wait for a response from the terminal 220a. Once a response form the terminal 220a is received, the terminal 220b may perform different actions based on the response. If the received response is an acknowledgment response, then terminal 220a has relinquished its role as Master Coordinator and assumed the role of a peer. Accordingly, the terminal 220b at 430 may assume the role of Master Coordinator and proceed to 480 to update its system-wide configuration data 230b.

However, if a locked response is received, then the terminal 220a has refused to relinquish the Master Coordinator role because the terminal 220a is preparing to update its system-wide configuration data 230a. In which case, the terminal 220b at 440 may wait for an announcement from the Master Coordinator of new system-wide configuration data 230a and update its system-wide configuration data 230b accordingly in response to such announcement. The terminal 220b may then return to 420 to send another master handoff request in order to obtain the Master Coordinator role.

If a not-master response is received, then the terminal 220a has already acknowledged a master handoff request of another terminal (e.g., terminal 220c) and has already relinquished the Master Coordinator role. In which case, the terminal 220b at 450 may wait for a beacon signal from the new Master Coordinator. The terminal 220b may then return to 420 to send master handoff request to the newly identified Master Coordinator in order to obtain the Master Coordinator role for itself.

If an out-of-date response is received, then the system-wide configuration data 230b of the terminal 220b does not match the system-wide configuration data 230a of the Master Coordinator terminal 220a. In which case, the terminal 220b at 460 may obtain the system-wide configuration data 230a from the Master Coordinator terminal 220a, and update its system-wide configuration data 230b accordingly. The terminal 220b may then return to 420 to send another master handoff request to the Master Coordinator terminal 220a in order to obtain the Master Coordinator role for itself.

If a configuration-branch response is receive, then the Master Coordinator terminal 220a has determined that the system-wide configuration data 230b of the requesting terminal 220b does not match its system-wide configuration data 230a, but has also determined the system-wide configuration data 230 of the requesting terminal 220b does not correspond to a prior system-wide configuration data of its revision history 234a. Hence, the Master Coordinator terminal 220a may assume a configuration branch has occurred with each terminal 220a, 220b containing some configuration data not contained in the other terminal's system-wide configuration data 230a, 230b. To preserve the integrity of the system-wide configuration data, the Master Coordinator terminal 220a prevents the requesting terminal 220b from propagating its system-wide configuration data 230b. Rather, the terminal 220b at 470 may transition to a Sync Failed state until the configuration branch can be resolved via other techniques, such as manual intervention by the user.

At 480, the terminal 220b has obtained the Master Coordinator role and is free to update its system-wide configuration data 230b. Desirably, the terminal 220b combines as many changes as possible into a single transaction to ensure all related data is changed atomically to reduce possible system instability in case another terminal 220a or 220c starts a transaction after part of the data is changed. After the system-wide configuration data 230b is updated, the terminal 220b generates a new configuration identifier 232b for the system-wide configuration data 230b and updates the revision history 234b. In one embodiment, the terminal 220b generates a random number for the configuration identifier 232b. The terminal 220b further inserts the newly generated configuration identifier 232 inserted into the revision history 234b to maintain a history of system-wide configuration data.

To protect against the case where the telephone system 200 becomes segmented into sub-parts that operate independently from other sub-parts for a period of time, the configuration identifiers 232a-c are not sequentially generated. Rather, a new configuration identifier 232a-c is generated whenever there is a configuration update. Moreover, each terminal 220a-c may maintain its own random number generator, seeded by information unique to each terminal 220a c (e.g., the terminal's Ethernet MAC address) to reduce the possibility of duplicate numbers from being independently generated in segmented sub-sites.

After updating the system-wide configuration data 230b, the terminal 220b at 490 generates beacon signals which include the new configuration identifier 232b and possibly the former configuration identifier. Peer terminals 220a, 220c receiving these beacon signals may recognize their system-wide configuration data 230a, 230c are out-of-date, and may request the updated system-wide configuration data from the Master Coordinator terminal 220b.

Various embodiments of the invention are described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible computer readable medium such as, for example, flash memory devices, hard disk devices, compact disc media, DVD media, EEPROMs, etc. Such instruction when executed by a telephone terminal or other device, may configure the telephone terminal or other device to perform tasks associated with receiving requests for configuration data residing on other telephone terminals and acting as a proxy for such requests for configuration data.

One skilled in the art would readily appreciate that many modifications and variations of the disclosed embodiments are possible in light of the above teachings. Thus, it is to be understood that, within the scope of the appended claims, aspects of the disclosed embodiments may be practiced in a manner other than as described above.

What is claimed is:

1. A telephone system, comprising:
   a first telephone terminal that is a voicemail enabled Internet Protocol (IP) telephone, the first telephone terminal conducts a telephone call over an IP network, and broadcasts on the IP network a beacon signal having a first configuration identifier for system-wide configuration data stored by the first telephone terminal; and
   a second telephone terminal that is a voicemail enabled IP telephone, the second telephone terminal conducts a telephone call over the IP network with the first telephone terminal, and receives the beacon signal via the IP network, the second telephone terminal transmits to the first telephone terminal a master handoff request having a second configuration identifier for a system-wide configuration data stored by the second telephone terminal, and the second telephone terminal assumes a master coordinator role in response to receiving an acknowledgement from the first telephone terminal.

2. The telephone system of claim 1, wherein the first telephone terminal stores a revision history of the first and second configuration identifiers to determine whether the second configuration identifier provided by a verification request from the second telephone terminal matches a configuration identifier of the revision history, and to remove the second telephone terminal from the telephone system if a match of the second configuration identifier is not found in the revision history.

3. The telephone system of claim 2, wherein, the first telephone terminal transmits to the second telephone terminal an update notification in response to the verification request if the second configuration identifier provided by the verification request matches a configuration identifier of the revision history of the first and second configuration identifiers.

4. The telephone system of claim 2, wherein the revision history of the first and second configuration identifiers are transferable from the first telephone terminal to the second telephone terminal at the master handoff request by the second telephone terminal to the first telephone terminal.

5. The telephone system of claim 2, wherein and the system-wide configuration data includes data used to configure the first and second telephone terminals for one or more telephony features of the telephone system.

6. The telephone system of claim 2, wherein the first telephone terminal, in response to the master handoff request, sends a configuration-branch response to the second telephone terminal if the system-wide configuration data of the second telephone does not match the system-wide configuration data of the first telephone terminal and does not correspond to prior system-wide configuration data tracked by the revision history.

7. The telephone system of claim 1, wherein the first telephone terminal and the second telephone terminal each maintain a separate random number generator and seed the respective random number generators with data unique to the respective terminal, and the second telephone terminal, in response to changing the system-wide configuration data for the telephone system, updates the first and second configuration identifiers, and broadcasts beacons including the updated first and second configuration identifiers on the IP network.

8. The telephone system of claim 7, wherein the second telephone terminal obtains the master coordinator role from the first telephone terminal prior to changing the system-wide configuration data for the telephone system, and updates the first and second configuration identifiers by setting each of the first and second configuration identifiers to a number generated by its random number generator.

9. The telephone system of claim 1, wherein the beacon signal broadcast by the first telephone terminal includes a configuration identifier for a previous version of the system-wide configuration data, and the second telephone terminal requests the first telephone terminal to transfer the system-wide configuration data to the second telephone terminal in response to determining that the second configuration identifier for the system-wide configuration data stored by the second telephone terminal corresponds to the configuration identifier for the previous version of the system-wide configuration data.

10. The telephone system of claim 1, wherein the first telephone terminal, in response to the master handoff request determines based upon the second configuration identifier of the master handoff request whether the system-wide configuration data stored by the second telephone terminal is out-of-date, and sends an out-of-date response to the second telephone terminal in response to determining that the system-wide configuration data of the second telephone terminal is out-of-date.

11. The telephone system of claim 10, wherein the first telephone terminal, in response to the master handoff request sends a locked response to the second telephone terminal in response to determining that the first telephone terminal is in the process of updating the system-wide configuration data, and sends a not-master response to the second telephone terminal in response to determining that the first telephone terminal is no longer operating in the master coordinator role.

12. A telephone system including a plurality of telephone terminals, the system comprising:
   a first telephone terminal including a base unit, that base unit sends and receives voice signals over an Internet Protocol (IP) network of the telephone system, transmits and receives beacon signals via the IP network, and determines whether system-wide configuration data for the telephone system stored by the first telephone terminal is up-to-date based upon a first configuration identifier of the beacon signals, and the first telephone terminal is a public switched telephone network (PSTN) enabled telephone terminal; and a second telephone terminal that transmits to the first telephone terminal a master handoff request having a second configuration identifier for a system-wide configuration stored by the second telephone terminal, and assumes a master coordinator role in response to receiving an acknowledgement from the first telephone terminal, and the second telephone terminal is a PSTN enabled telephone terminal.

13. The first telephone terminal of claim 12, wherein the base unit stores a revision history of the first and second configuration identifiers, to determine whether the second configuration identifier provided by a verification request from the second telephone terminal matches a configuration identifier of the revision history, and removes the second telephone terminal from the telephone system if a match of the second configuration identifier is not found in the revision history, and the base unit of the first telephone terminal transmits to the second telephone terminal an update notification in response to a verification request if the second configuration identifier provided by the verification request matches a configuration identifier of the revision history of the first and second configuration identifiers.

* * * * *